United States Patent
Gaid et al.

(10) Patent No.: US 8,092,687 B2
(45) Date of Patent: Jan. 10, 2012

(54) METHOD AND INSTALLATION FOR TREATING AN AQUEOUS PHASE CONTAINING AN ADSORBENT USED MATERIAL

(75) Inventors: Abdelkader Gaid, Paris (FR); Philippe Sauvignet, Saint Etienne en Cogles (FR)

(73) Assignee: OTV SA, Saint-Maurice Cedex (FR)

( * ) Notice: Subject to any disclaimer, the term of this patent is extended or adjusted under 35 U.S.C. 154(b) by 217 days.

(21) Appl. No.: 12/647,104

(22) Filed: Dec. 24, 2009

(65) Prior Publication Data
US 2010/0187179 A1    Jul. 29, 2010

(51) Int. Cl.
C02F 1/28    (2006.01)
(52) U.S. Cl. .................. 210/670; 210/672; 210/694
(58) Field of Classification Search .............. 210/670, 210/672, 690, 691, 694
See application file for complete search history.

(56) References Cited

FOREIGN PATENT DOCUMENTS

| EP | 1418001 | 10/2003 |
|---|---|---|
| FR | 2868064 | 3/2004 |
| GB | 1583881 | 5/1977 |
| GB | 1422725 | 3/1979 |
| NL | 1063121 | 8/1959 |
| WO | 98/43738 | 10/1998 |

*Primary Examiner* — Chester Barry
(74) *Attorney, Agent, or Firm* — Coats & Bennett, P.L.L.C.

(57) ABSTRACT

The invention relates to a method and installation for treatment of an aqueous phase containing a used adsorbent powdery material, such as activated carbon powder, from a water purification or potabilization installation, wherein said method includes: a first step of desorbing the main part of the organic matter adsorbed on the used adsorbent powdery material consisting of placing said aqueous phase containing the used adsorbent powdery material in contact with a desorbent compound resulting in a first aqueous phase containing at least partially regenerated adsorbent powdery material and desorbed organic matter; a first step of separating by sedimentation the main part of the desorbed organic matter from the rest of the first aqueous phase containing the at least partially regenerated adsorbent powdery material leading to the production of a second aqueous phase containing the at least partially regenerated adsorbent powdery material; a first step of neutralizing said second aqueous phase containing the at least partially regenerated adsorbent powdery material; a second step of separating the at least partially regenerated adsorbent powdery material from said second aqueous phase leading to the production of a third aqueous phase containing the at least partially regenerated adsorbent powdery material.

22 Claims, 4 Drawing Sheets

Figure 1:
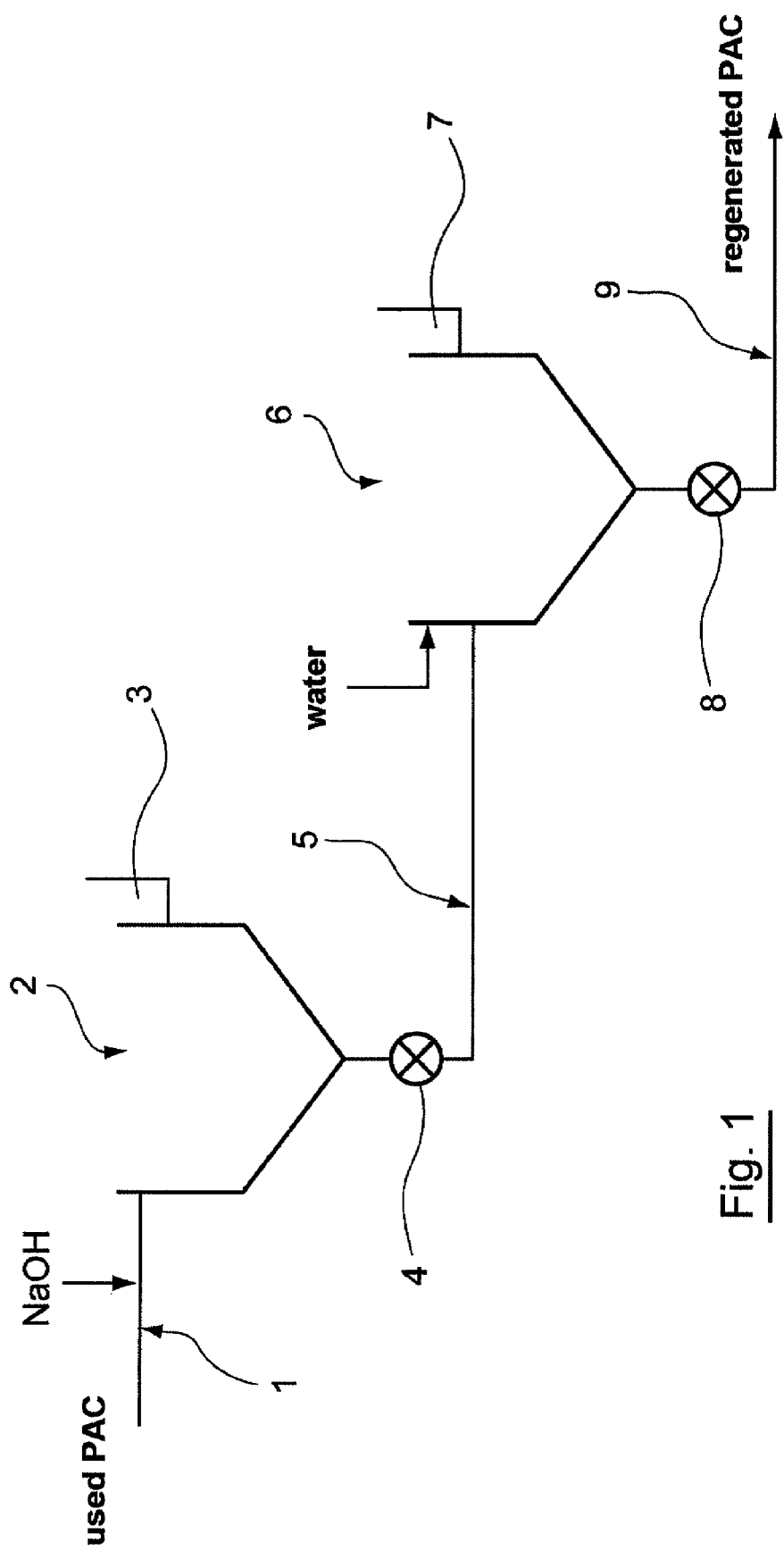

METHOD AND INSTALLATION FOR TREATING AN AQUEOUS PHASE CONTAINING AN ADSORBENT USED MATERIAL

This application claims priority based on French Patent Application No. 0859088 filed 26 Dec. 2008.

TECHNICAL FIELD OF THE INVENTION

The invention relates to the field of water treatment.

More specifically, the invention relates to method for treating water in order to purify it or render it potable, implementing at least one treatment step in which the water is placed in contact with an adsorbent powdery material so as to reduce the organic matter content thereof.

PRIOR ART

Such adsorbent materials can be implemented in the context of such methods and installations according to different configurations.

According to one type of configuration, the adsorbent material is provided in the form of a fixed bed held in an installation forming a filter by suitable means. The water to be treated passes through this fixed bed on which the water is filtered and the organic matter is adsorbed. To produce such filtering beds, granular activated carbon (GAC) is often used. GAC has an average particle size of between one and several millimeters.

According to another type of configuration, the adsorbent granular material is added to the water to be treated in a reactor according to a contact time sufficient to enable adsorption of the organic matter. This used adsorbent material must then be separated from the treated water by suitable means. It is this second type of configuration to which the invention more specifically relates.

For this type of configuration, activated carbon powder (PAC) is commonly used. By activated carbon powder, we mean an inert carbonated material, with a highly developed intrinsic porosity with a specific surface that gives it the property of adsorbing, i.e. binding to its internal surface, organic molecules, and catalyzing reactions. The activated carbon can be of plant origin (coconut, etc.) or mineral origin (coal, etc.). The specific surface of an activated carbon, expressed in square meters per gram of carbon, is measured according to the BET method (in the name of its authors: M M. Brunauer, Emmet and Teller). It consists of quantifying the surface accessible by the molecules of a gas (nitrogen or argon) in the pores of the activated carbon.

The PACs used in the context of the water treatment methods generally have an average particle size of between 10 μm and 50 μm and a specific surface corresponding to an iodine number of between 800 and 1000 mg/g of PAC.

According to the second type of configuration indicated above, the water is placed in contact with the adsorbent powdery material for a contact time sufficient to enable the main part of the organic matter to be adsorbed on the material in question. This mixture of water and adsorbent material then undergoes a separation step intended to result in water free of the main part of its organic matter and sludge containing the adsorbent material on which the organic matter and the pollutants are adsorbed. This separation step is generally implemented by sedimentation, in which the sludge is collected in the lower portion of the settling tank and the clarified water is collected in the upper portion of same.

In consideration of the relatively high cost of the adsorbent materials, and in particular of the activated carbon powder, it is common when implementing the water treatment methods using the injection of such a material to recycle it. To this end, it is known to treat sludge collected at the end of the separation step indicated above and containing the adsorbent material so as to remove the main part of the aqueous phase therefrom. This step is generally implemented by hydrocyclone separation. At the end of this step, by hydrocyclone underflow, a phase containing adsorbent powdery material is obtained, which can be reintroduced into the water treatment method. In practice, this phase contains a high proportion of powdery material and also water and is in the form of a relatively fluid sludge, while the main part of the aqueous phase of the sludge coming from the separation step indicated above has nevertheless been eliminated in the hydrocyclone under flow.

An example of such a method of the prior art, moreover including a coagulation step and a flocculation step, is described in the French patent application FR-A-2868064.

According to such a prior art document, the adsorbent powdery material is not regenerated when it is recycled. In particular, the used adsorbent material is not freed in the hydrocyclone step of the main part of the organic matter adsorbed on it. The organic matter is therefore recycled, but its adsorption capacity is significantly reduced, thereby significantly reducing the benefit of such a recycling operation.

The adsorption capacity of an adsorbent material is dependent on a plurality of factors, which are dependent on the nature thereof. In the case of PAC, the adsorption capacity is essentially related to its porosity and therefore its specific surface. When the PAC is used, i.e. when it has been used to adsorb the organic matter contained in a fluid, a certain proportion of its pores is occupied by the adsorbed material and is therefore unavailable.

In practice, it is possible to evaluate the adsorption capacity of an adsorbent powdery material by measuring its iodine number. The adsorption capacity by measuring the iodine number indicates the amount of iodine, expressed in milligrams, adsorbed per gram of activated carbon powder material. For new PAC, the iodine number is generally between 800 and 1000 according to the manufacturer. This iodine number measurement can in particular be performed according to the protocol proposed by ASTM under reference D4607.

OBJECTIVES OF THE INVENTION

An objective of this invention is to propose a method that, in at least one of its embodiments, enables the adsorbent material coming from a water treatment installation, hereinafter referred to as a used adsorbent material, to be at least partially regenerated, i.e. enabling its adsorption capacity with regard to the organic matter to be at least partially restored.

Another objective of the invention is to propose a method that, in at least one of its embodiments, can be implemented in small installations, with a simple design, requiring only easy and infrequent maintenance, and capable of being easily integrated in classic water treatment installations in order to purify water or render it potable.

Yet another objective of the invention is to describe such a method that, in at least one of its embodiments, enables 50% of the adsorption capacity of the adsorbent material to be restored, i.e. enabling an at least partially regenerated adsorbent material to be obtained, of which the adsorption capacity corresponds to at least 50% of that of the same new adsorbent material.

Another objective of the invention is to propose an installation for implementing such a method.

DESCRIPTION OF THE INVENTION

These various objectives, as well as others to be described below, are achieved by the invention, which relates to a method for treating an aqueous phase containing a used adsorbent powdery material, such as activated carbon powder, coming from a water purification or potabilization installation implementing at least one step of injecting said adsorbent powdery material into said water and a step of adsorption of at least a portion of the organic matter contained in said water on said adsorbent powdery material, said method includes at least:

a first step of desorbing the main part of the organic matter adsorbed on the used adsorbent powdery material consisting of placing said aqueous phase containing used adsorbent powdery material in contact with a desorbent compound, wherein said first desorption step results in a first aqueous phase containing at least partially regenerated adsorbent powdery material and desorbed organic matter;

a first step of separating by sedimentation the main part of the desorbed organic matter from the rest of the first aqueous phase containing the at least partially regenerated adsorbent powdery material, said first separation step leads to the production of a second aqueous phase containing the at least partially regenerated adsorbent powdery material;

a first step of neutralizing said second aqueous phase containing the at least partially regenerated adsorbent powdery material;

a second step of separating the at least partially regenerated adsorbent powdery material from said second aqueous phase, said second separation step leads to the production of a third aqueous phase containing the at least partially regenerated adsorbent powdery material.

The method according to the invention enables, for example, the adsorption capacity of a used PAC, having been used in a water treatment method and having an iodine number of between 200 and 350, to be reestablished to an adsorption capacity corresponding to an iodine number of between 400 and 600 for an adsorption capacity of the same new PAC of between 800 and 1000.

Thus, the invention enables, in its preferred embodiment, the adsorption capacity of the activated carbon to be restored to at least 50% of its initial value.

According to an advantageous feature, said first desorption step consists of placing said aqueous phase containing the used adsorbent powdery material in contact with an alkalinizing compound enabling its pH to be brought to a pH of at least 9.

According to another advantageous feature, said first desorption step consists of placing said aqueous phase containing the used adsorbent powdery material in contact with an acidifying compound enabling its pH to be brought to a maximum pH of 6.

Implementing alkalizing or acidifying compound injections provides the advantage of enabling different parts of the organic matter adsorbed on the adsorbent powdery material to be desorbed.

According to an advantageous embodiment, a method according to the invention includes at least:

a second step of desorbing the main part of the residual organic matter adsorbed on the partially regenerated adsorbent powdery material contained in said third aqueous phase, said second desorption step leads to the production of a fourth aqueous phase containing the at least partially regenerated powdery material;

a third step of separating the main part of the desorbed residual organic matter from the rest of said fourth aqueous phase, said third separation step leads to the production of a fifth aqueous phase containing the at least partially regenerated powdery material;

a second step of neutralizing said fifth aqueous phase containing the at least partially regenerated powdery material;

a fourth step of separating the at least partially regenerated adsorbent powdery material from the rest of said fifth aqueous phase.

In this case, said first desorption step (said second desorption step, respectively) advantageously consists of placing said aqueous phase containing the used adsorbent powdery material (said third aqueous phase, respectively) in contact with an alkalizing compound enabling its pH to be brought to a pH of at least 9, and in that said second desorption step (said first desorption step, respectively) consists of placing said third aqueous phase (said aqueous phase containing used adsorbent powdery material, respectively) in contact with an acidifying compound enabling its pH to be brought to a maximum pH of 6.

As explained above, the adsorptions by means of an alkalizing or an acidifying agent each lead to the desorption of a different part of the organic matter adsorbed on the adsorbent powdery material. The combination of desorption by means of an alkalizing agent and desorption by means of an acidifying agent therefore optimizes the reduction of the organic matter adsorbed on the powdery material both in terms of quantity and diversity. Preferably, said first or said second desorption step consists of placing said aqueous phase in contact with an alkalizing compound enabling its pH to be brought to a pH of around 11. It is indeed at this pH of around 11 that the fastest desorption of the organic matter adsorbed in particular on PAC has been observed.

It is possible to use during this step of desorbing different types of alkalizing compounds. Soda, which has the advantage of being inexpensive and readily available, is preferably chosen.

Advantageously, said acidifying compound belongs to the group including:

citric acid;

sulfuric acid.

It has been noted that these acids enable good results to be obtained at a lower cost.

Advantageously, said first neutralization step and said second separation step are implemented concomitantly in a sedimentation step upstream of which service water is provided in a sufficient amount to said second aqueous phase containing the at least partially regenerated adsorbent powdery material. By "sufficient amount", we mean an amount enabling the pH to be reduced to a pH of around 7.

According to another alternative, said first neutralization step and said second separation step are implemented concomitantly in a hydrocyclone step during which service water is provided as a washing fluid. In such an embodiment, the service water provided as a separation fluid in the hydrocyclone will be provided at a flow rate and in a sufficient amount to observe a reduction in pH to around 7.

According to an alternative, said third separation step is a sedimentation step.

Advantageously, said second neutralization step and said fourth separation step are implemented concomitantly in a sedimentation step upstream of which service water is provided in a sufficient amount to said fifth aqueous phase containing the at least partially regenerated adsorbent powdery material.

Preferably, said second neutralization step and said fourth separation step are implemented concomitantly in a hydrocyclone step during which service water is provided as a washing fluid.

This invention also covers any installation for implementing a method for treating an aqueous phase containing an adsorbent powdery material, such as used activated carbon powder from a water purification or potabilization installation implementing at least one step of injecting said adsorbent powdery material into said water and at least one step of adsorbing at least a portion of the organic matter contained in said water on an adsorbent powdery material, characterized in that it includes:

first means for supplying, in said second aqueous phase containing the used adsorbent powdery material, a desorbent compound, resulting in a first aqueous phase containing the at least partially regenerated adsorbent powdery material and the desorbed organic matter;

first means for separating the main part of the desorbed organic matter from the rest of the first aqueous phase containing the at least partially regenerated adsorbent powdery material, resulting in a second aqueous phase containing the partially regenerated adsorbent powdery material; said first means for separation comprising a settling tank;

first means for supplying a compound enabling said second aqueous phase containing the at least partially regenerated adsorbent powdery material to be neutralized;

second means for separating the at least partially regenerated adsorbent powdery material from the rest of said second aqueous phase, resulting in the production of a third aqueous phase containing the at least partially regenerated adsorbent powdery material.

According to another embodiment, such an installation includes:

second means for supplying, in said third aqueous phase, a desorbent compound, resulting in a fourth aqueous phase containing the at least partially regenerated adsorbent powdery material and the desorbed organic matter;

third means for separating the main part of the desorbed organic matter from the rest of the fourth aqueous phase containing the at least partially regenerated adsorbent powdery material, resulting in a fifth aqueous phase containing the partially regenerated adsorbent powdery material;

second means for supplying a compound enabling said fifth aqueous phase containing the at least partially regenerated adsorbent powdery material to be neutralized;

fourth means for separating the at least partially regenerated adsorbent powdery material from the rest of said fifth aqueous phase.

According to a preferred alternative, said third (2') separation means include a settling tank.

Advantageously, said first and/or second means for supplying a compound enabling said second and/or said third aqueous phase containing the at least partially regenerated adsorbent powdery material to be neutralized consist of water supply means.

According to a first alternative, said second separation means and/or said fourth separation means include a settling tank. According to another alternative, they include a hydrocyclone.

Figure 2:
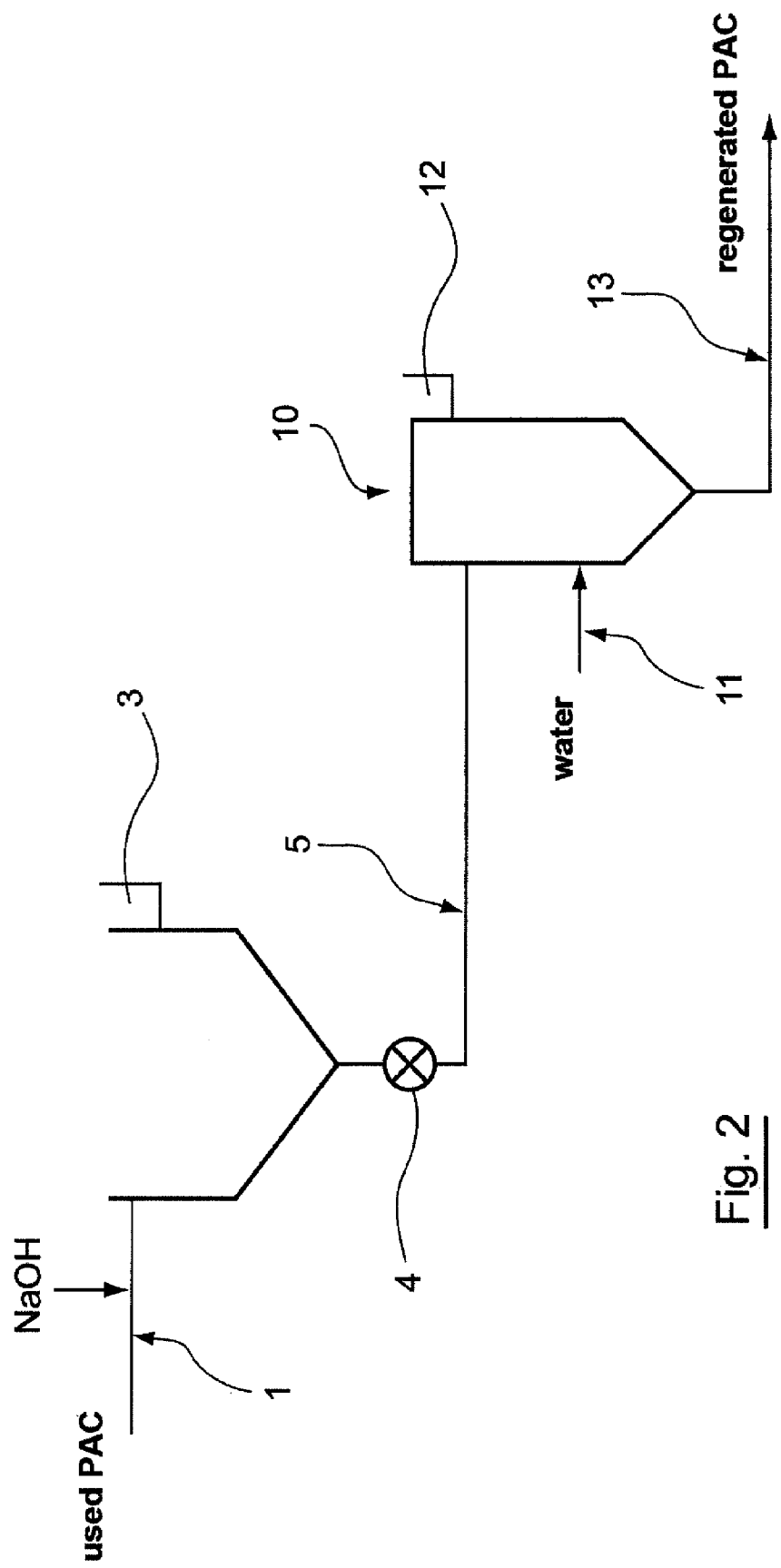
Figure 3:
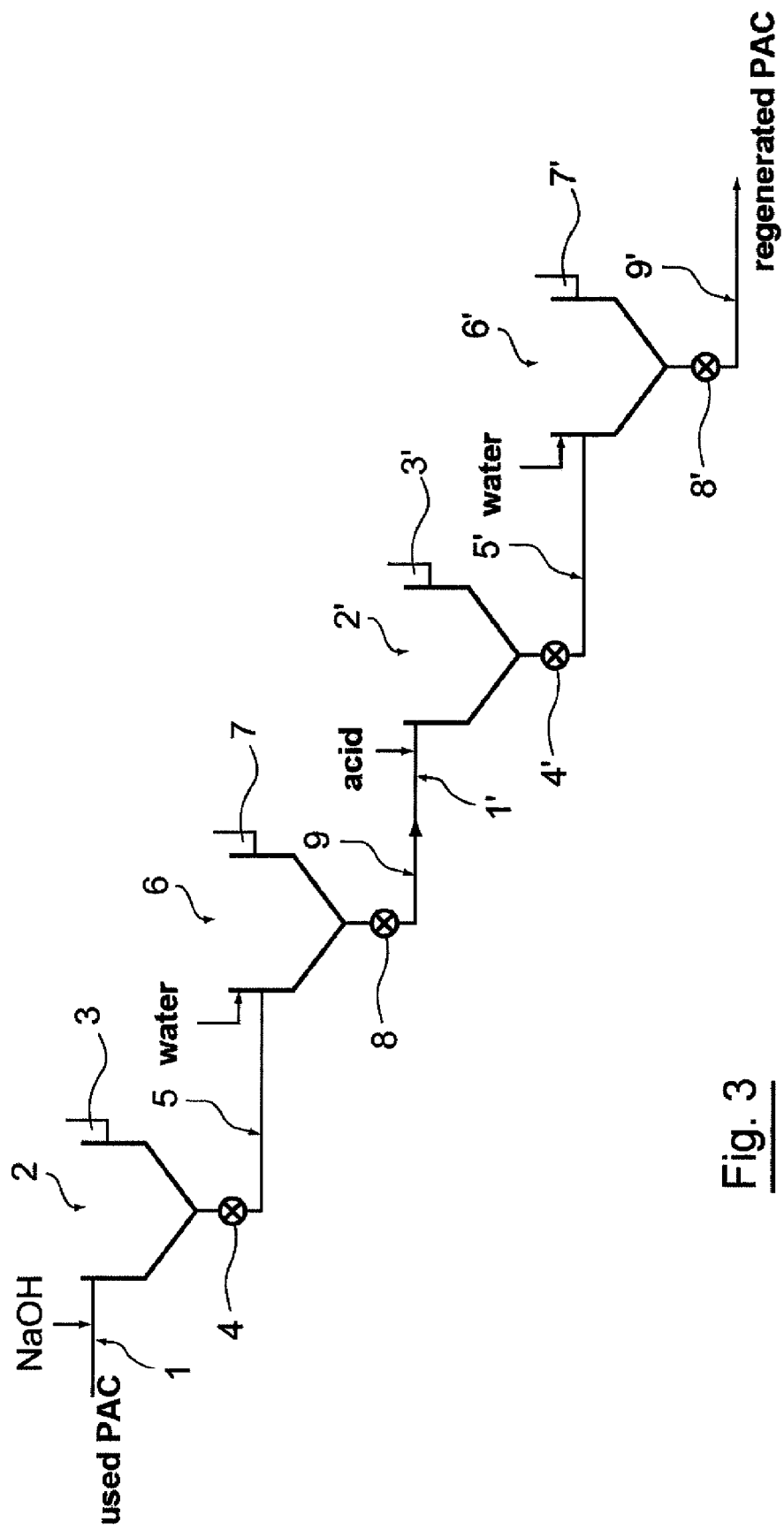
Figure 4:
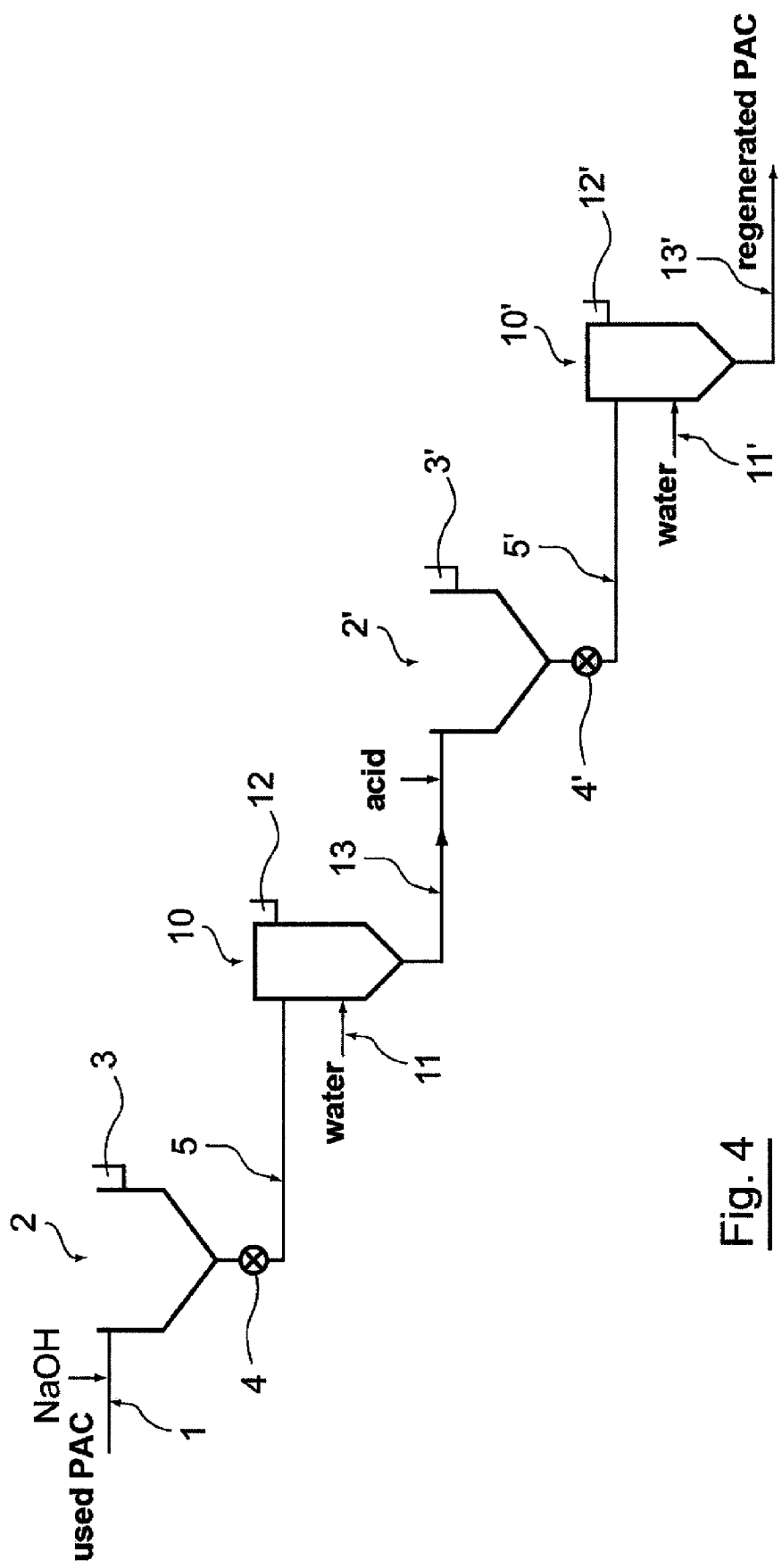

The invention, as well as the various advantages that it has, can be better understood in view of the following description of non-limiting examples of embodiments provided in reference to the drawings, in which:

FIG. 1 diagrammatically shows a first embodiment of an installation for implementing the method according to the invention;

FIG. 2 diagrammatically shows a second embodiment of an installation for implementing a method according to the invention;

FIG. 3 diagrammatically shows a third embodiment of an installation for implementing a method according to the invention;

FIG. 4 diagrammatically shows a fourth embodiment of an installation for implementing a method according to the invention.

FIRST EMBODIMENT

In reference to FIG. 1, an aqueous phase containing used PAC from a water treatment installation is supplied by a channel 1 into a settling tank 2.

Soda is added to this aqueous phase containing used PAC at the level of the channel 1. This supply of soda enables the pH of the initial aqueous phase containing the used PAC to be increased, and enables a first aqueous phase of which the pH is brought to a value of around 11 to be obtained. This increase in the pH enables the organic matter absorbed on the used PAC to be desorbed quickly and released into the first aqueous phase.

The sedimentation, which occurs in the settling tank 2, makes it possible to:

obtain an aqueous phase containing the desorbed organic matter and recover said aqueous phase containing the desorbed organic matter in the upper portion of the settling tank 2 in a chute 3, and;

obtain a second aqueous phase containing the partially regenerated PAC in the form of sludge capable of being discharged by the lower portion of the settling tank 2.

This sludge containing regenerated PAC and a small amount of water is supplied by a pump 4 and via a channel 5 into a second settling tank 6.

Water is injected into this second settling tank 6, in a sufficient amount to bring the pH of the phase present in said settling tank to a value of around 7.

The organic matter still present in the sludge coming from the first settling tank 2 can thus be separated by the sedimentation occurring in said second settling tank 6.

This aqueous phase containing the rest of the organic matter can be discharged via a chute 7, while a third aqueous phase containing the partially regenerated PAC almost free of organic matter and still containing a very small amount of water can be recovered in the lower portion of the settling tank 6 and discharged by means of a pump 8 through a channel 9.

The third phase containing the partially regenerated PAC obtained at the outlet of the channel 9 can be reused in the context of the water treatment installation having produced the used PAC.

SECOND EMBODIMENT

FIG. 2 diagrammatically shows a second embodiment of an installation for implementing the method.

In this embodiment, the second phase containing the regenerated PAC coming from the first settling tank via the channel 5 is supplied not to a second settling tank 6 but to a hydrocyclone 10.

Classically, this second phase is injected tangentially into said hydrocyclone 10. IT is also provided with a separation fluid consisting of water and supplied into the lower portion of the hydrocyclone 10 by suitable supply means 11 enabling said water to be supplied tangentially into the hydrocyclone 10.

This hydrocyclone 10 enables the recovery in the underflow of a third aqueous phase free of its organic matter and containing for the most part at least partially regenerated PAC, and in its upper portion 12 an aqueous phase containing the rest of the organic matter.

Alternative Of The First And Second Embodiments

In an alternative of the first and second embodiments, which have just been described, respectively, in reference to FIGS. 1 and 2, the injection of soda is replaced by an injection of acid, such as sulfuric acid or citric acid.

The implementation of acid injections provides the advantage of enabling a different part of the organic matter adsorbed on the adsorbent powdery material to be desorbed than that desorbed by means of the soda injection.

THIRD EMBODIMENT

FIG. 3 shows a third embodiment of the technique according to the invention.

As shown in this FIG. 3, an installation according to this third embodiment includes the series arrangement of two installations according to the first embodiment.

Thus, in this third embodiment, the third aqueous phase containing the at least partially regenerated PAC, coming from the underflow of the settling tank 6, is supplied via a channel 1' into a settling tank 2'.

Acid is added to this third aqueous phase containing used PAC at the level of the channel 1'. This supply of acid enables the pH of the third aqueous phase containing partially regenerated PAC to be reduced, and a fourth aqueous phase of which the pH is brought to a value below 7 to be obtained. This reduction in the pH enables the organic matter adsorbed on the used PAC to be quickly desorbed and released into the fourth aqueous phase.

As explained above, the desorptions with acid or with soda each lead to desorption of a different part of the organic matter adsorbed on the adsorbent powdery material. The combination of desorption with soda and desorption with acid therefore optimizes the reduction of organic matter adsorbed on the powdery material in terms of both quantity and diversity.

The sedimentation that occurs in the settling tank 2' makes it possible to:
  obtain an aqueous phase containing the desorbed organic matter and recover said aqueous phase containing the desorbed organic matter in the upper portion of the settling tank 2' in a chute 3', and;
  obtain a fifth aqueous phase containing the partially regenerated PAC in the form of sludge capable of being discharged by the lower portion of the settling tank 2'.

This sludge containing regenerated PAC and a small amount of water is supplied by a pump 4' and via a channel 5' into a fourth settling tank 6'.

Water is injected into this fourth settling tank 6', in a sufficient amount to bring the pH of the phase present in said settling tank to a value of around 7.

The organic matter still present in the sludge coming from the third settling tank 2' can thus be separated by the sedimentation occurring in said fourth settling tank 6'.

This aqueous phase containing the rest of the organic matter can be discharged via a chute 7', while a final aqueous phase containing the partially regenerated PAC almost free of organic matter and still containing a very small amount of water can be recovered in the lower portion of the settling tank 6' and discharged by means of a pump 8' through a channel 9'.

The final phase containing the partially regenerated PAC obtained at the outlet of the channel 9' can be reused in the context of the water treatment installation having produced the used PAC.

FOURTH EMBODIMENT

FIG. 4 shows a fourth embodiment of the technique according to the invention.

As shown in this FIG. 4, an installation according to this fourth embodiment includes the series arrangement of two installations according to the second embodiment.

Thus, the third phase containing the regenerated PAC coming from the first hydrocyclone 10 via the channel 13 is supplied to a second settling tank 2'

Acid is added to this third aqueous phase containing at least partially regenerated PAC at the level of the channel 13. This supply of acid enables the pH of the third aqueous phase containing partially regenerated PAC to be reduced, and a fourth aqueous phase of which the pH is brought to a value below 7 to be obtained. This reduction in the pH enables the organic matter adsorbed on the used PAC to be quickly desorbed and released into the aqueous phase.

The sedimentation that occurs in the second settling tank 2' makes it possible to:
  obtain an aqueous phase containing the desorbed organic matter and recover said aqueous phase containing the desorbed organic matter in the upper portion of the settling tank 2' in a chute 3', and;
  obtain a fifth aqueous phase containing the partially regenerated PAC in the form of sludge capable of being discharged by the lower portion of the settling tank 2'.

This sludge containing regenerated PAC and a small amount of water is supplied by a pump 4' and via a channel 5' into a second hydrocyclone 10' into which it is injected tangentially.

This hydrocyclone 10' is also equipped with a separation fluid consisting of water and supplied into the lower portion of the hydrocyclone 10' by suitable supply means 11' enabling this water to be supplied tangentially into the hydrocyclone 10'.

This hydrocyclone 10' enables the recovery in the underflow 13' of a final aqueous phase free of its organic matter and containing for the most part at least partially regenerated PAC and, in its upper portion 12', an aqueous phase containing the rest of the organic matter.

The final phase containing partially regenerated PAC obtained at the underflow 13' of the second hydrocyclone 10' can be reused in the context of the water treatment installation having produced the used PAC.

Alternative Of The Third And Fourth Embodiments

In an alternative of the third and fourth embodiments, it is possible to implement first a desorption with acid and, second, a desorption with soda.

According to an optional feature, a step consisting of determining the concentration of desorbed organic matter present in the aqueous phase at the outlet of the second settling tank or the first hydrocyclone is implemented. This enables the desorption rate achieved to be evaluated, and consequently enables information representing the degree of regeneration of the adsorbent powdery material to be obtained. This information can then be compared to a predetermined threshold value in order to evaluate the opportunity to implement a second desorption. Thus, when it is considered that the degree of regeneration of the adsorbing agent is insufficient, a second desorption will be implemented.

Other Alternative

According to another alternative, it is possible for the water necessary for neutralization of the second and/or third aqueous phases to be injected upstream of the settling tank, and to be mixed well by circulating the mixture obtained after injection in a static mixer.

The invention claimed is:

1. A method for treating water having a concentration of organic material contained therein, the method comprising:
    treating the water with powdered activated carbon and adsorbing organic material contained in the water onto the powdered activated carbon to reduce the concentration of organic material in the water;
    adding a first desorbing reagent to the water and desorbing organic material from the powdered activated carbon to at least partially regenerate the powdered activated carbon and produce a first aqueous stream containing the desorbed organic material and the at least partially regenerated powered activated carbon;
    separating some of the desorbed organic material from the first aqueous stream to produce a second aqueous stream containing an additional amount of the desorbed organic material and the at least partially regenerated powdered activated carbon;
    neutralizing the second aqueous stream; and
    separating the at least partially regenerated powdered activated carbon from the second aqueous stream containing the additional amount of the desorbed organic material to produce a third aqueous stream containing the at least partially regenerated powdered activated carbon.

2. The method of claim 1 wherein the first desorbing reagent comprises an alkalizing reagent.

3. The method of claim 2 wherein adding the first desorbing reagent to the water further comprises increasing the pH of the water to at least 9.

4. The method of claim 3 wherein adding the first desorbing reagent to the water further comprises increasing the pH of the water to approximately 11.

5. The method of claim 2 wherein the alkalizing reagent comprises sodium hydroxide.

6. The method of claim 1 wherein the first desorbing reagent comprises an acid.

7. The method of claim 6 wherein adding the first desorbing reagent to the water further comprises reducing the pH of the water to a maximum of 6.

8. The method of claim 6 wherein the acid comprises either citric acid or sulfuric acid.

9. The method of claim 1 wherein neutralizing the second aqueous stream and separating the at least partially regenerated powdered activated carbon from the second aqueous stream occur simultaneously.

10. The method of claim 1 wherein neutralizing the second aqueous stream comprises adding service water to the second aqueous stream to adjust the pH of the second aqueous stream to approximately 7.

11. The method of claim 1 further comprising directing the first aqueous stream to a first separator and directing the second aqueous stream to a second separator.

12. The method of claim 1 further comprising directing the first aqueous stream to a first separator and directing the second aqueous stream to a first hydrocyclone.

13. The method of claim 1 wherein the organic material is a first type of organic material and the method further comprises:
    adding a second desorbing reagent to the third aqueous stream and desorbing the second type of organic material from the powdered activated carbon to further regenerate the powdered activated carbon and produce a fourth aqueous stream containing the desorbed second type of organic material and the further regenerated powdered activated carbon;
    separating some of the desorbed second type of organic material from the fourth aqueous stream to produce a fifth aqueous stream containing an additional amount of the desorbed second type of organic material and the further regenerated powdered activated carbon;
    neutralizing the fifth aqueous stream;
    separating the further regenerated powdered activated carbon from the fifth aqueous stream;
    recycling the further regenerated powdered activated carbon for further water treatment.

14. The method of claim 13 wherein:
    adding the first adsorbing reagent to the water further comprises contacting the water with an alkalizing reagent and increasing the pH of the water to at least 9; and
    adding the second adsorbing reagent to the third aqueous stream further comprises contacting the third aqueous phase with an acid and decreasing the pH of the third aqueous phase to at most 6.

15. The method of claim 13 wherein neutralizing the fifth aqueous stream and separating the further regenerated powdered activated carbon from the fifth aqueous stream occur simultaneously.

16. The method of claim 15 wherein neutralizing the fifth aqueous stream comprises adding service water to the fifth aqueous stream to adjust the pH of the fifth aqueous stream to approximately 7.

17. The method of claim 13 wherein the first desorbing reagent comprises sodium hydroxide and the second desorbing reagent comprises either citric acid or sulfuric acid.

18. The method of claim 13 wherein:
    the step of separating some of the desorbed organic material from the first aqueous stream occurs in a first separator;
    the step of separating the at least partially regenerated powdered activated carbon from the second aqueous stream occurs a second separator;
    the step of separating some of the desorbed organic material from the fourth aqueous stream occurs in a third separator; and
    the step of separating the further regenerated powdered activated carbon from the fifth aqueous stream occurs in a fourth separator.

19. The method of claim 13 further comprising:
    the step of separating some of the desorbed organic material from the first aqueous stream occurs in a first separator;
    the step of separating the at least partially regenerated powdered activated carbon from the second aqueous stream occurs a first hydrocyclone;

the step of separating some of the desorbed organic material from the fourth aqueous stream occurs in a second separator; and the step of separating the further regenerated powdered activated carbon from the fifth aqueous stream occurs in a second hydrocyclone.

20. The method of claim 13 wherein an adsorption capacity of the powdered activated carbon is regenerated at least 50%.

21. A method for regenerating powdered activated carbon contained in water, the powdered activated carbon having first and second types of organic material adsorbed thereon, the method comprising:

a first phase including:
adding a first desorbing reagent to the water and removing the first type of organic material from the powdered activated carbon to at least partially regenerate the powdered activated carbon and produce a first aqueous stream containing the removed first type of organic material and at least partially regenerated powdered activated carbon;

separating a first amount of the removed first type of organic material from the first aqueous stream to produce a second aqueous stream containing a second amount of the removed first type of organic material and the at least partially regenerated powdered activated carbon;

neutralizing the second aqueous stream;

separating the at least partially regenerated powdered activated carbon from the second aqueous stream to produce a third aqueous stream containing the at least partially regenerated powdered activated carbon;

a second phase including:
adding a second desorbing reagent to the third aqueous stream and removing the second type of organic material from the at least partially regenerated powdered activated carbon to further regenerate the powdered activated carbon and produce a fourth aqueous stream containing the removed second type of organic material and the further regenerated powdered activated carbon;

separating a first amount of the removed second type of organic material from the fourth aqueous stream to produce a fifth aqueous stream containing a second amount of the removed second type of organic material and the further regenerated powdered activated carbon;

neutralizing the fifth aqueous stream;

separating the further regenerated powdered activated carbon from the fifth aqueous stream; and recycling the further regenerated powdered activated carbon for further water treatment.

22. A system for regenerating powdered activated carbon contained in water wherein the powdered activated carbon has organic material adsorbed thereon, the system comprising:

a water supply inlet through which water containing powdered activated carbon having organic material adsorbed thereon passes into the system;

a first desorbing reagent inlet for adding a first desorbing reagent into the water;

wherein the first desorbing reagent is effective to remove at least a portion of the organic material from the powdered activated carbon and produce water containing at least partially regenerated powdered activated carbon and desorbed organic material;

a first separator disposed downstream from the water supply inlet effective to receive the water containing the at least partially regenerated powdered activated carbon and desorbed organic material and separate the at least partially regenerated powdered activated carbon from some of the desorbed organic material in the water;

a first outlet through which the water containing the at least partially regenerated powdered activated carbon passes out of the first separator;

a second separator disposed downstream from the first separator effective to receive the water containing the at least partially regenerated powdered activated carbon passing out of the first separator and separate the at least partially regenerated powdered activated carbon from an additional amount of the desorbed organic material in the water;

a service water inlet operatively connected to the second separator effective to neutralize the pH of the water in the second separator; and a second outlet through which the at least partially regenerated powdered activated carbon passes out of the second separator.

* * * * *